United States Patent [19]

Nolan

[11] Patent Number: 5,669,483
[45] Date of Patent: Sep. 23, 1997

[54] CONVEYOR FOR TRANSPORTING A WORKPIECE ALONG A CURVED PATH

[76] Inventor: John Nolan, 39283 E. Archer, Harrison Township, Mich. 48045

[21] Appl. No.: 389,175

[22] Filed: Feb. 15, 1995

[51] Int. Cl.$^6$ .................... B65G 21/14; B65G 21/16
[52] U.S. Cl. ............................... 198/812; 198/831
[58] Field of Search ............................. 198/812, 831

[56] References Cited

U.S. PATENT DOCUMENTS

| | | | |
|---|---|---|---|
| 3,584,731 | 6/1971 | Dahlem et al. | 198/831 X |
| 4,489,826 | 12/1984 | Dubson | 198/812 |
| 5,141,102 | 8/1992 | Roinestad et al. | 198/831 X |
| 5,400,898 | 3/1995 | Weber | 198/831 X |

FOREIGN PATENT DOCUMENTS 58-193807  11/1983  Japan .................... 198/812

*Primary Examiner*—F. J. Bartuska
*Attorney, Agent, or Firm*—Joseph G. Burgess

[57] ABSTRACT

A conveyor for transporting a workpiece from a first position to a second position along a curved path. The conveyor includes side members including a plurality of individual members arranged adjacent one another and allowing for such that individual members may move in a longitudinal direction relative to adjacent individual members to change the overall length of the side member. The side members are interconnected through use of slots and fasteners such that the slots in adjacent individual members are offset to allow for longitudinal adjustment between the adjacent members. Such adjustment results in an adjustable flexible conveyor enabling the conveyor to be adjustable in either direction along a particular curved path or configuration.

6 Claims, 4 Drawing Sheets

CONVEYOR FOR TRANSPORTING A WORKPIECE ALONG A CURVED PATH

BACKGROUND OF THE INVENTION

1. Field of the Invention

A conveyor for transporting parts from a fast position to a second position along a path which is not a straight line between the two positions. More specifically, the path that the part travels is a combination of straight and curved or arcuate sections. The path may comprise a straight portion at each end coupled by an arcuate section.

2. Description of the Related Art

Belt-type conveyors are well known in the art, and feature a moving or travelling belt to transport a workpiece from a first location to a second location. Belt-type conveyors commonly include a drive means such as an electric motor coupled to a reducer driving a sprocket. A drive shaft is rotatably attached to a conveyor frame. Drive sprockets are fixed to the drive shaft and engage a conveyor belt such that rotation of the drive shaft causes the conveyor belt to move relative to the conveyor frame. At the end of the conveyor opposite the drive shaft is a take up shaft. Attached to the take up shaft are sprockets engaging the conveyor belt. Attached to the take up shaft is an adjustment means to preload the conveyor belt to a desired and adjustable pretension.

This type of conveyor is widely used in a variety of industries, including manufacturing facilities in which it is desired to transport workpieces from one location to another. For example, in normal use machining centers are connected by a series of inline or straight line conveyors. These conveyors normally transfer the workpieces from one machining center to the next; i.e., between machining centers. It is not uncommon for a machining center to become inoperative or break down, thus requiring it be bypassed. Normally, a portable conveyor is used to assist in moving the items from the disabled machinery to storage or a transportation device such as a cart or fork lift truck. However, conveyors are normally of a straight line design and are not easily positioned adjacent a machine to assist in workpiece removal.

Many types of conveyor belts are capable of flexing within the direction of the plane of the belt; i.e., when viewed from a plan view. However, previous designs that incorporate some type of side flex belt usually incorporate a fixed radius of curvature unique to a specific design. Thus, it is desirable to provide a conveyor which is adjustable and flexible to allow a conveyor to follow a curved path that can be infinitely adjustable in any direction to allow the end user to select the amount of curvature required for a particular configuration.

SUMMARY OF THE INVENTION

Accordingly, the present invention is a unique conveyor system for transporting workpieces along a curved path wherein the configuration of the conveyor can be adjusted to follow a particular curved path and positioned in a particular configuration. In general, the conveyor includes a fixed length of conveyor belt which does not change as the conveyor is curved or configured. In order that the conveyor may curve, the side rails or support members of the conveyor may be varied in length through use of an adjustment screw and locking means. By adjusting the length of the sides of the conveyor, the overall curvature or configuration of the conveyor may be changed.

One advantage of the present invention is that a conveyor having adjustable flexible sides allows the conveyor to follow a curved path which can be infinitely adjustable in either direction to allow an end user to select the amount of flex or curvature required for a particular configuration. A conveyor, according to the present invention, is especially useful as a substitute or replacement conveyor to assist in transporting workpieces either around an inoperative machine or for use in loading parts to a single piece of machinery.

BRIEF DESCRIPTION OF THE DRAWINGS.

FIG. 2 is a plan view of the conveyor assembly of FIG. 1 according to the

FIG. 8a is a partial side view taken in the direction shown by arrow 8a.

DESCRIPTION OF THE PREFERRED EMBODIMENT(S)

Figure 1:
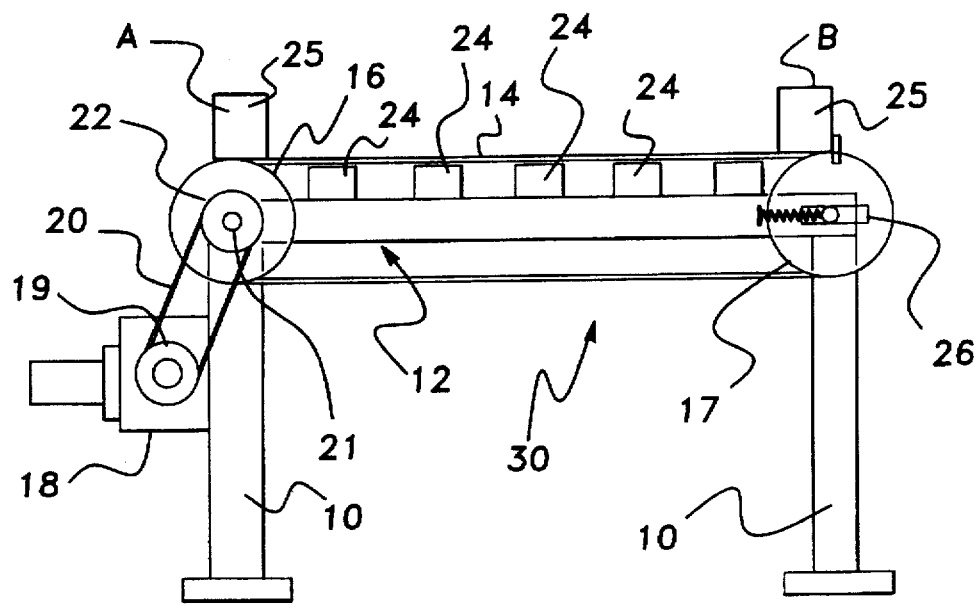
FIG. 1 is a side view of a conveyor assembly according to the prior art.
Figure 2:
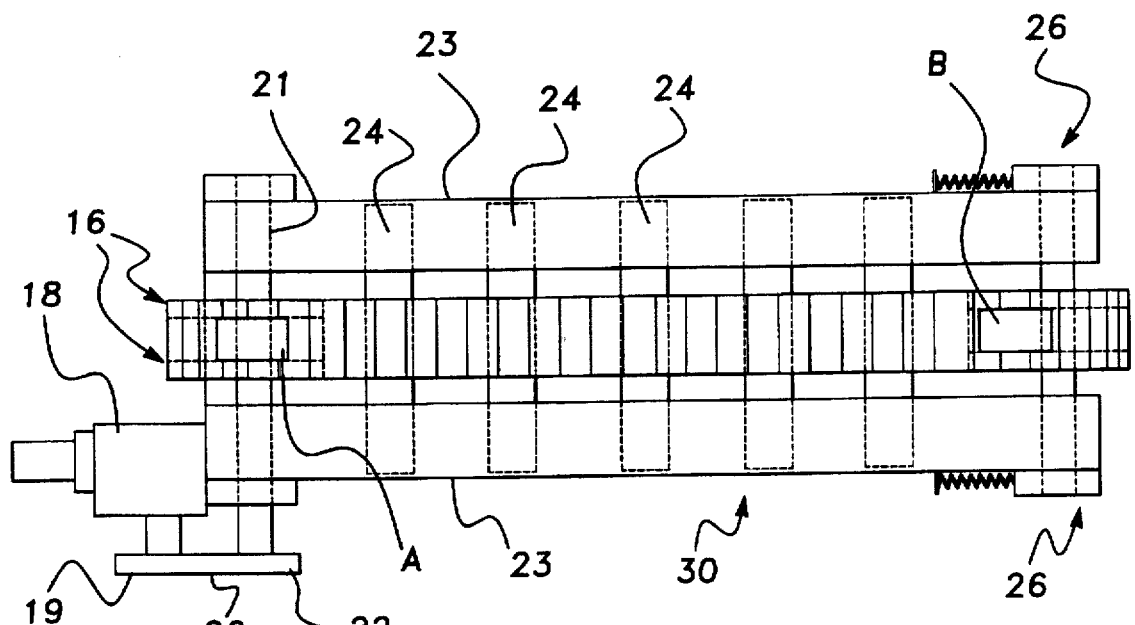

The illustrated conveyor 30 as shown in FIGS. 1 and 2 is adapted to be used for moving or transporting a workpiece along a curved path. The conveyor 30 includes a plurality of like members 10 which support an overall conveyor frame assembly, seen generally at 12. A belt 14 is supported on the frame assembly 12 by a drive roller 16 and a tension or take up roller 17. Teeth (not shown) of the drive roller 16 engage the belt 14 such that rotation of the drive roller 16 causes movement of the belt 14. An electric motor 18 is mounted to the frame assembly 12 and is coupled through a drive sprocket 19 and a drive chain 20 to a second drive sprocket 22 connected to a drive shaft 21 on which the drive roller 16 is mounted. The take up roller 17 is attached to the frame assembly 12 via an adjustment means 26 which preloads or pretensions the belt 14. Such an adjustable or pretensioned means is known in the conveyor art and will not be further discussed. The frame assembly 12 includes individual side members 23 interconnected by a plurality of cross members 24. The cross members 24 also support the conveyor belt 14 along the length of the conveyor 30 such that a workpiece 25 can be moved from point A to point B. The foregoing description of a standard belt-type conveyor is not intended to limit the scope of the invention set forth herein.

Figure 3:
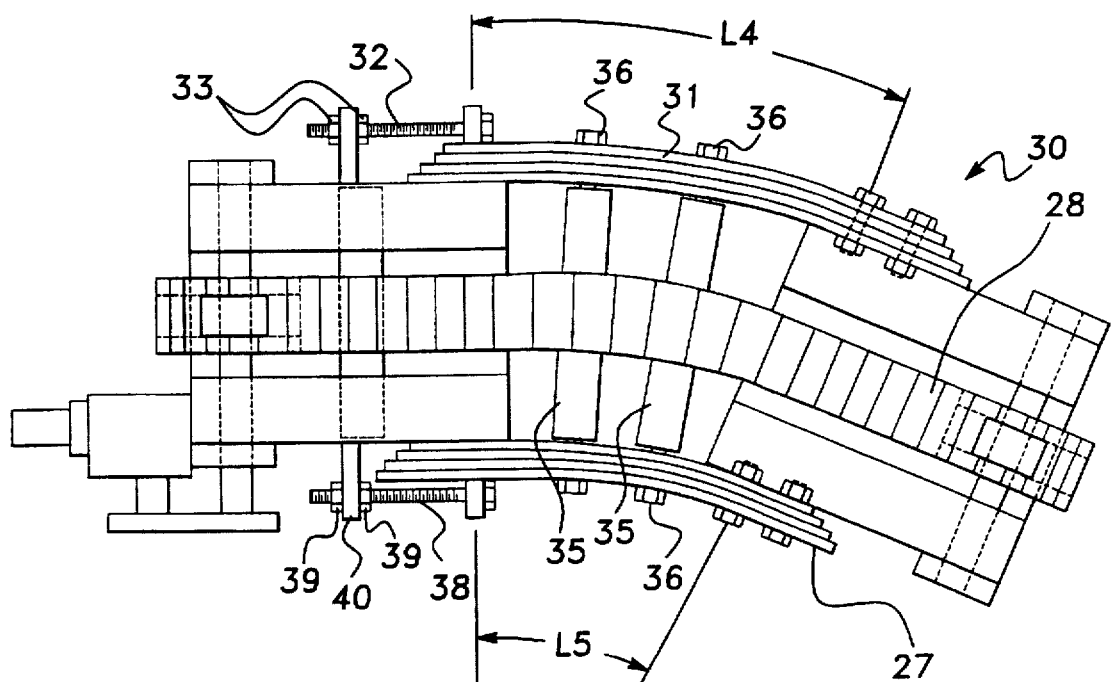
FIG. 3 is a plan view of an adjustable conveyor apparatus according to the present invention.
Figure 4:
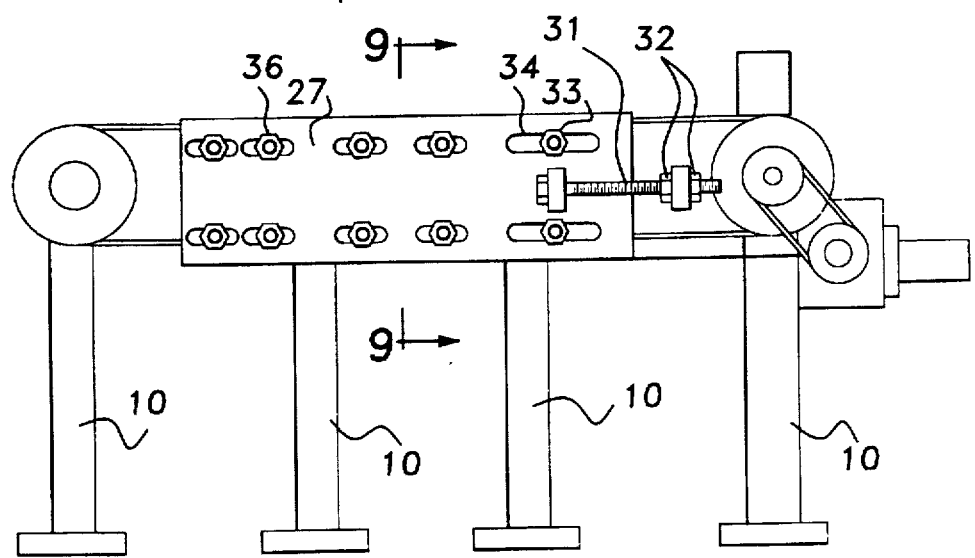
FIG. 4 is a side view of the conveyor apparatus of FIG. 3 according to the present invention.

Turning now to FIGS. 3–8, since the total length of the conveyor is established by the length of the conveyor belt, the length does not change as the conveyor 30 is curved about an axis $A_o$. As used herein, the belt 14 is a side flexing table top chain manufactured by the Rex-Nord Company of Milwaukee, Wis. Hence $L_2$, the length of the conveyor belt 28 at its center or midpoint, with respect to the width $W_c$ of the conveyor belt 28, is a constant. For every length $L_4$ (the length of the conveyor belt 28 at the outside edge) a corresponding discrete value can be established for $L_5$ (the inner length) for the angle of the bend θ and for the radius of curvature ($R_c$). FIG. 3 shows an outer side rail 31 that can be varied in length through the use of an adjustment screw 32 and locking means 33. Correspondingly, an inner side rail 27 may also be varied in length through use of a second adjustment screw 38 and locking means 39. Increasing the overall length $L_4$ of the outer rail 31 results in a corresponding decrease in the length $L_5$ of the inner rail 27 to maintain the desired angle of curvature or bend θ about the axis of curvature $A_o$. Adjustment and locking of the side rails 27, 31 is accomplished through slots 34 in the side rails 27, 31.

Figure 9:
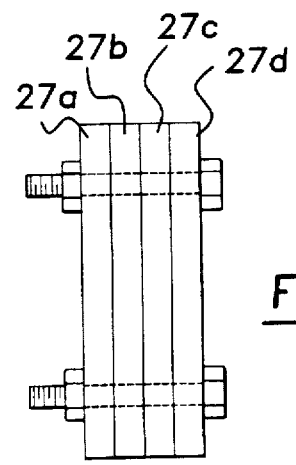
FIG. 9 is a cross-sectional view taken along Line 9—9 of FIG. 4.

As shown in FIG. 9, the side rails 27, 31 are formed of a plurality of thin-walled members 27a–d placed and layered adjacent one another. Individual members 27a–d may move in a longitudinal direction relative to an adjacent individual member. Thus, the adjacently layered thin-walled members result in a side rail member 27, 31 having a low stiffness in the direction of the conveyor configuration; i.e., direction of bending and a high stiffness in a direction transverse the direction of bending; i.e., the direction or axis of support. Each individual member includes at least one slot therein, the slots arranged such that a common fastener, typically cross member 35, secured by lock nuts 36, may extend through the slots to couple the members together. It should be appreciated that the slots in adjacent members may be offset such that only a portion of the slots coincide. The construction of side rail 27, 31 is a multiple stack of thin members such as spring steel or what is commonly referred to as "blue steel". The stiffness in the direction of the curve is relatively low while the stiffness in the opposite direction is substantial.

Figure 10:
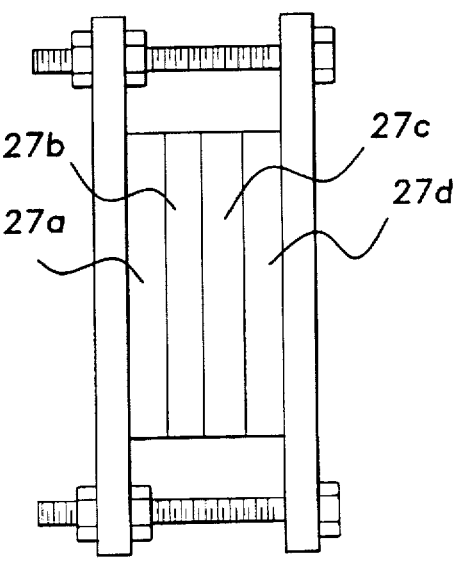
FIG. 10 is an alternate embodiment of the clamping arrangement set forth in FIG. 9.

FIG. 10, shows an alternative embodiment of the method to clamp or lock the individual adjacent, members 27a–d in a set or locked position as opposed to the clamping arrangement set forth in FIG. 9. As shown therein, a pair of gibs 50,52 are placed adjacent the outer adjacent members 27a–d such that when a pair of locking screws 54,56 are tightened, the individual adjacent members 27a–d are sandwiched together in a clamped position.

Since the inner side raft 27 maintains a constant spacing in width from the outer side rail 31 by use of the cross spacers 35 for every length $L_4$, there is a single corresponding length $L_5$ and the system is therefore stable.

The construction of the inner side/aft 27 is identical to the outer side rail 31. The difference in terms of operation is that the length of adjusting screw 32 is increased through use of the stop nuts 33 while the inner stop nuts 39 are moved a sufficient distance away from the fixed lug to allow the inner side rail 27 to assume the proper unencumbered length that is required for the conveyor 30 to curve about the center $A_o$.

Figure 8:
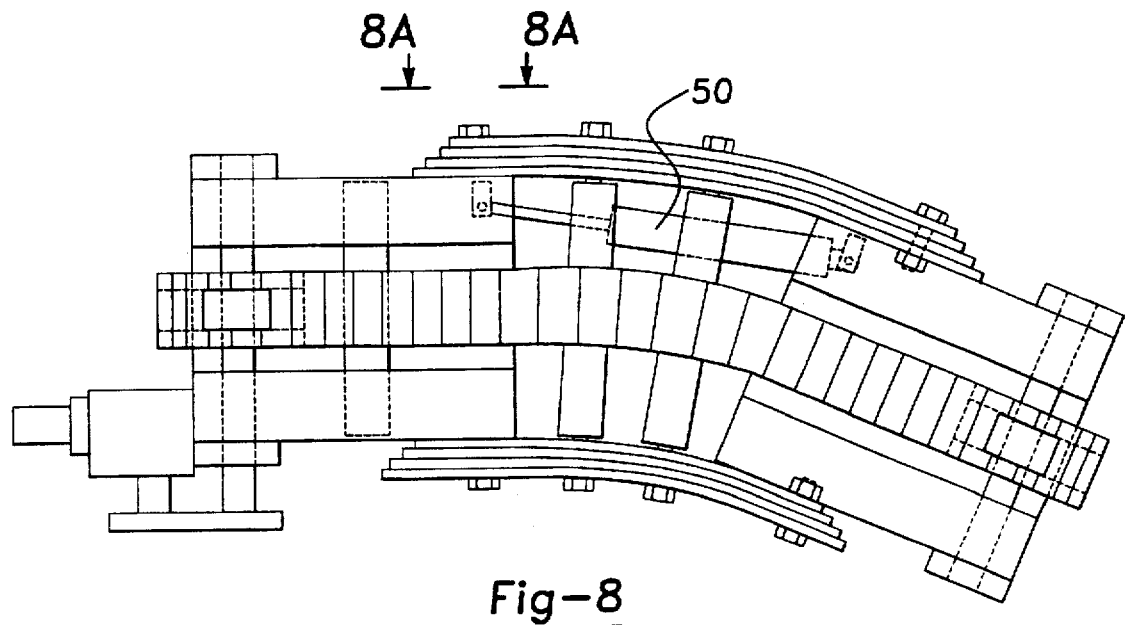
FIG. 8 is an alternate e embodiment of the conveyor of FIG. 3 illustrating a power adjustability means.
Figure 8A:
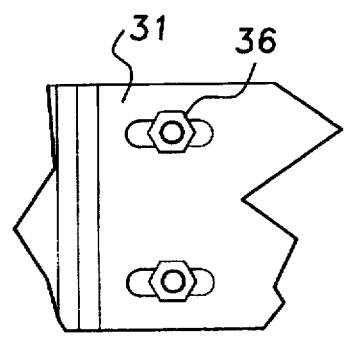

Although FIG. 3 shows the adjusting mechanism to be an adjustment screw 32, FIG. 8 discloses an additional means of changing the length of the outer side rail 27 and corresponding inner side rail 31 by use of a hydraulic cylinder 50. This could also be a ball screw or any one of a number of devices that would allow the outer side rail 31 to change in length while the inner side rail 27 is released and allowed to assume a corresponding length associated with the particular combination of geometry.

It must also be recognized that while we have been discussing the increasing of the length of the inner side rail 31, this could also be decreasing the length of the outer side rail 27 and the curvature would be identical—it would simply change the direction of the curvature.

Since it may be desirable to configure this conveyor as a portable unit, the conveyor 30 may include batteries and to power the system as a stand alone, rechargeable unit. To increase portability, wheels may be added to the conveyor feature for rolling the unit from place to place. Additionally, through use, of a clutching arrangement it is possible to have the main conveyor drive motor power the wheels that the system rolls on and thereby assist in the movement of the conveyor from place to place.

Figure 5:
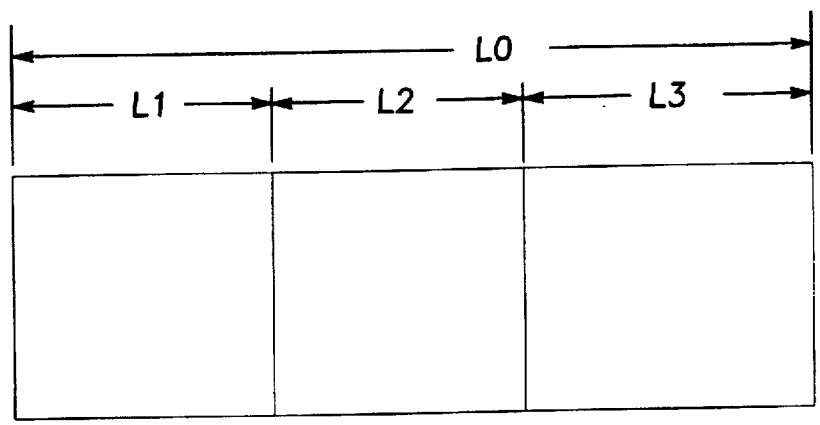
FIG. 5 is a schematic plain view of a conveyor apparatus according to the present invention shown in a straight line and connected between two straight line conveyors.
Figure 6:
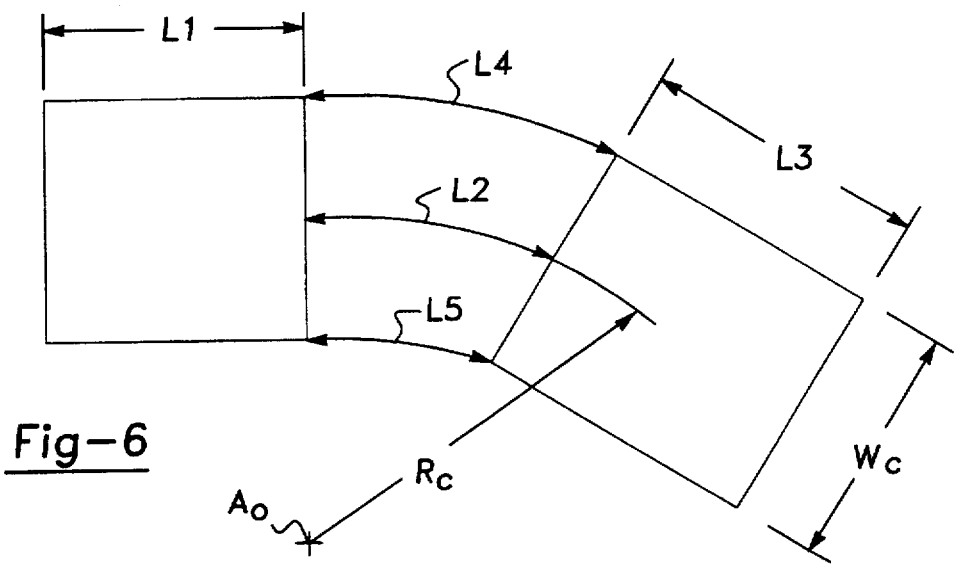
FIG. 6 is a schematic plan view of an adjustable conveyor apparatus in a curved configuration between two straight line conveyors, according to the present invention.
Figure 7:
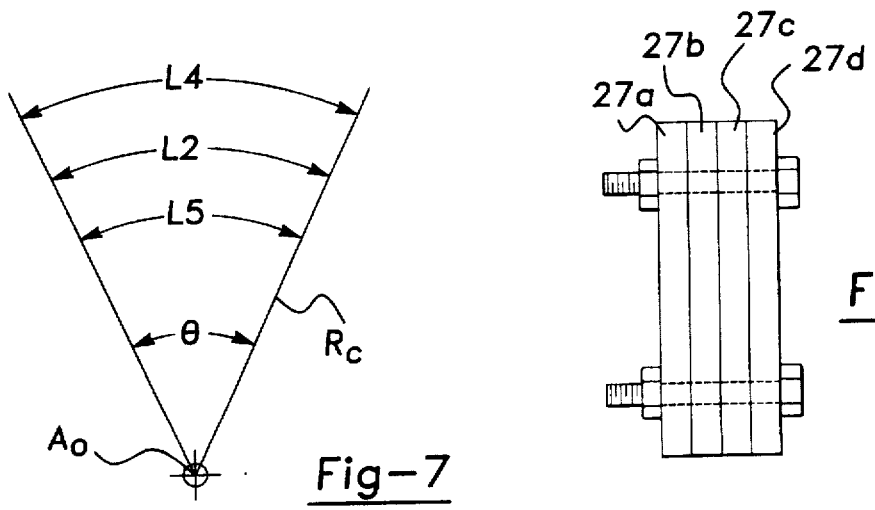
FIG. 7 is a schematic view illustrating the varying lengths and angles of an adjustable conveyor having a curved configuration about a curvature axis, according to the present invention.

Turning to FIGS. 5 and 6, it is apparent that the total length of the conveyor is the sum of the lengths $L_1+L_2+L_3$ or the total length=$L_o$ (length over-all). If length $L_1$ and length $L_2$ are conventionally constructed, straight line conveyor sections and length $L_2$ is the section corresponding to the curved section shown in FIG. 4. Looking at FIG. 7, the following is the method of calculation to determine the proportionality between a change in length for $L_4$, the outer side rail 31 length, and the angle of curvature θ for the section wherein:

$R_c$= the radius of curvature; i.e., the distance from the center of curvature $A_o$ and the length $L_2$ η=the angle of curvature $W_c$=the width of the conveyor belt Δ=the change in length between $L_2$ and $L_4$ the path length $L_2$ can be determined by $$L_2 = R_c \theta \qquad \text{Eq.1}$$

the length ($L_4$) of the outside rail 31 can be determined by $$L_4 = \left( R_c + \frac{W_c}{2} \right) \theta \qquad \text{Eq. 2}$$

Additionally, the length ($L_4$) of the outer side rail 31 also equals $$L_4 = L_2 + \Delta \qquad \text{Eq.3}$$

substituting for $L_4$ above:

$$L_2 + \Delta = \left( R_c + \frac{W_c}{2} \right) \theta \qquad \text{Eq. 4}$$

simplifying for $R_c$ from Eq.1

$$R_c = \frac{L_2}{\theta} \qquad \text{Eq. 5}$$

substituting for $R_c$ $$L_2 + \Delta = \frac{L_2}{\theta} + \frac{W_c}{2} \theta \qquad \text{Eq. 6}$$

simplifying Eq.4

$$L_2 + \Delta = L_2 + \frac{W_c}{2} \theta \qquad \text{Eq. 7}$$

subtracting $L_2$ from both sides of Eq.7 results in $$\Delta = \frac{W_c \theta}{2} \quad \text{Eq. 8}$$

rewriting Eq.8

$$\theta = \frac{2\Delta}{W_c} \quad \text{Eq. 9}$$

Therefore, if the outer side rail 31 is changed in length by an incremental amount $\Delta$, a discrete value for the angle $\theta$ that the conveyor will curve can be calculated. Hence, it can be shown that the length $L_4$, $L_5$ of both of the two side rail sections 27, 31, $L_4$ and $L_5$ are proportional to the amount of change in length $L_4$ of the outside rail 31, $L_4$, and that the radius of the curvature can also be calculated using the same methodology.

I claim:

1. A conveyor for use in transporting a workpiece along a curved path comprising:
   a frame, said frame including a supporting structure having opposite and parallel spaced side members interconnected by cross supports;
   a drive roller attached to said side members at one end thereof;
   a take up roller attached to said side members at an end opposite said drive roller;
   a belt engaging said drive and take up rollers, such that movement of said drive roller causes movement of said belt;
   said side members formed of a plurality of individual members arranged in adjacent layers such that individual members may move in a longitudinal direction relative to adjacent individual members to change the length of the side member;
   means for interconnecting the individual members together while allowing for relative longitudinal movement between the individual members;
   and means for adjusting the overall length of the side members to adjust the configuration of the conveyor.

2. A conveyor as set forth in claim 1 wherein said individual members are formed of a thin wall spring steel resulting in a side member having a low stiffness in the direction of the configuration of the conveyor and a high stiffness in a direction transverse the configuration.

3. A conveyor as set forth in claim 1 wherein said means for interconnecting the individual members together includes a plurality of slots in said individual members, the slot being arranged adjacent such that a common fastener member may extend through the individual slots to couple the members together.

4. A conveyor as set forth in claim 3 wherein said slots in adjacent members are offset such that only a portion of the slots coincide.

5. A conveyor as set forth in claim 1 wherein said means for adjusting the overall length of said side members includes a threaded member attached on one end to an individual member of said side member and attached at said other end to a stationary portion of said conveyor such that rotation of said threaded member causes movement of said individual members in a longitudinal direction to vary the overall length of said side member.

6. A conveyor as set forth in claim 1 wherein said means for adjusting the overall length of said side member includes a hydraulic cylinder fixed at one end to the stationary portion of said conveyor wherein said hydraulic cylinder comprises a body portion and a piston portion, said body portion fixed to the stationary part of said conveyor and said piston fixed to one of said individual members of said side member such that relative movement of said piston with respect to said cylinder portion results in relative longitudinal movement between said individual members.

* * * * *

UNITED STATES PATENT AND TRADEMARK OFFICE
CERTIFICATE OF CORRECTION

PATENT NO. : 5,669,483
DATED : September 23, 1997
INVENTOR(S) : John Nolan

It is certified that error appears in the above-indentified patent and that said Letters Patent is hereby corrected as shown below:

Column 1, line 7, "fast" should be -- first --.

Column 2, line 17, after "the" insert -- prior art --.

Column 2, line 22, "plain" should be -- plan --.

Column 2, line 32, after "alternate" delete -- e --.

Column 3, line 50, "raft" should be -- rail --.

Column 3, line 54, "side/aft" should be -- side rail --.

Column 4, line 30, "η" should be -- θ --.

Signed and Sealed this

Sixteenth Day of December, 1997

Attest:

BRUCE LEHMAN

*Attesting Officer*  *Commissioner of Patents and Trademarks*